United States Patent [19]

Miller

[11] 4,084,561
[45] Apr. 18, 1978

[54] THROTTLE TRIMMING DEVICE

[76] Inventor: Harvey R. Miller, 3655 E. Amazon, Eugene, Oreg. 97405

[21] Appl. No.: 656,123

[22] Filed: Feb. 9, 1976

[51] Int. Cl.² .................. F02D 11/08; G05G 1/14
[52] U.S. Cl. ........................ 123/103 C; 74/513; 74/560
[58] Field of Search .......... 123/103 C, 103 E, 103 R, 123/98; 74/513, 560; 180/108, 109

[56] References Cited

U.S. PATENT DOCUMENTS

| 1,459,317 | 6/1923 | Birdsall | 74/513 |
| 2,207,700 | 7/1940 | Porter | 74/560 X |
| 2,825,418 | 3/1958 | Kershman | 123/103 E |
| 3,926,160 | 12/1975 | Husband | 123/103 E |

Primary Examiner—Carlton R. Croyle
Assistant Examiner—Leonard Smith
Attorney, Agent, or Firm—Eugene M. Eckelman

[57] ABSTRACT

A casing arranged to be connected to accelerator structure of a vehicle and movably enclosing a foot engaging member projecting through the top of the casing. An air tight collapsible bag in the casing is disposed under the foot engaging member, and such collapsible member is operable by the vacuum in the engine fuel intake system to automatically back off the throttle under certain engine conditions and to apply more throttle under other conditions for smoothening out the function of the vehicle and for other reasons.

3 Claims, 6 Drawing Figures

U.S. Patent   April 18, 1978   4,084,561
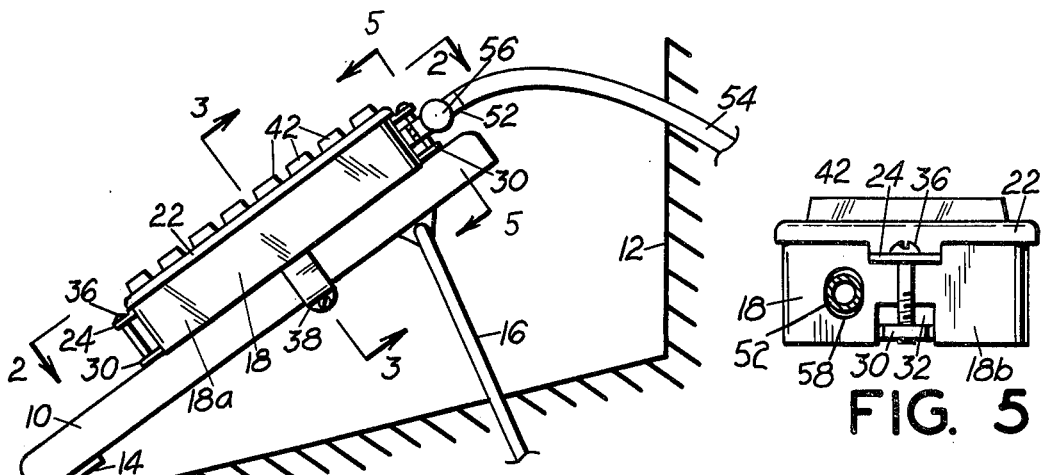
FIG. 1
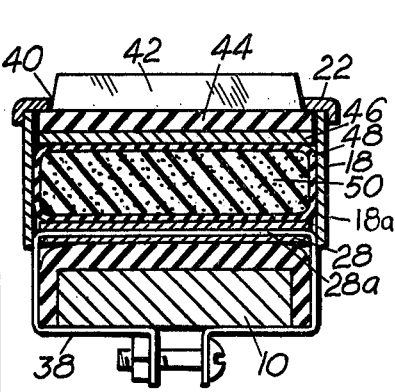
FIG. 5
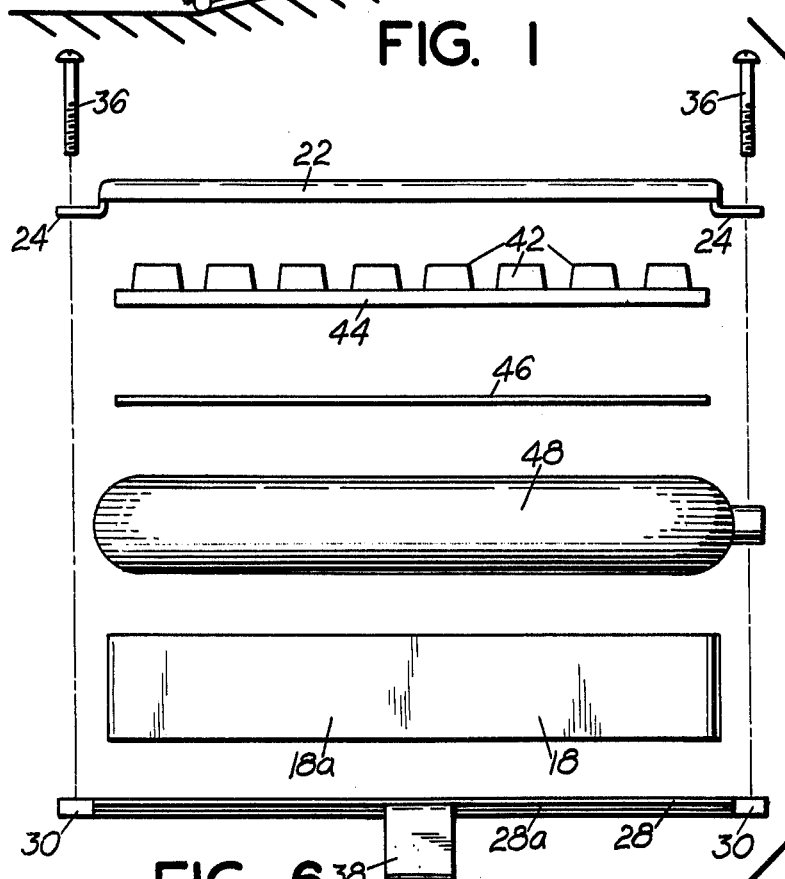
FIG. 6
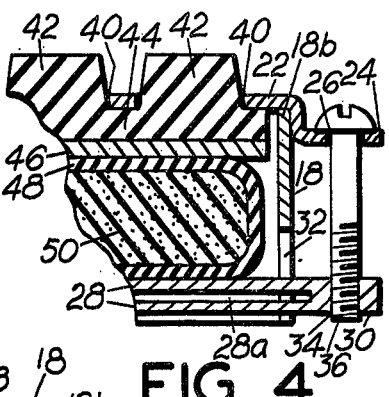
FIG. 3
FIG. 4
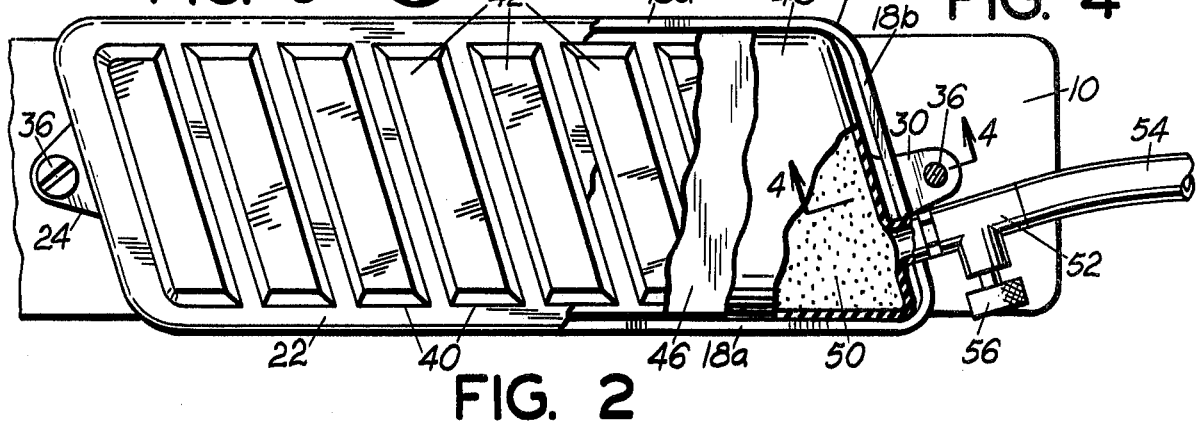
FIG. 2

THROTTLE TRIMMING DEVICE

BACKGROUND OF THE INVENTION

This invention relates to a throttle trimming device operable by the vacuum in the fuel intake system.

In internal combustion engines, vacuum conditions vary considerably in the fuel intake manifold at different phases of vehicle operation. That is for example when the throttle is depressed rather fast such as during initial acceleration or during any fast or hard acceleration, a lower vacuum condition will exist in the intake manifold than when the engine is in steady operation or during deceleration. In many operating conditions of the vehicle such as in conditions wherein the vacuum in the intake manifold is at higher values, it is easy for the operator to over-throttle since under such conditions excess depression of the accelerator pedal does not produce any greater power and the operator cannot feel this. Fuel is obviously wasted under such conditions. Also in the higher vacuum conditions such as in freeway driving the operator must raise and lower the pedal repeatedly according to the grade in the road and thus upon each down movement of the pedal, there is the possibility of over-throttling. Not only is fuel wasted in over-throttling but engine emissions are increased.

SUMMARY OF THE INVENTION

According to the present invention, it is a primary objective to provide a throttle trimming device that is associated with the throttle linkage of an internal combustion engine and arranged under the higher vacuum conditions of the fuel intake means to automatically back off the throttle under the foot of the operator and also at times to apply more throttle, thus reducing to some extent operator control of the throttle. This reduces over-throttling for one thing and in addition smoothens out operation. It also improves other vehicle functions such as for example it reduces fuel consumption and reduces exhaust emissions.

The objective is accomplished by using an accelerator pedal device that has vacuum collapsing means therein connected to the fuel intake manifold and arranged such that it raises and lowers relative to the operator's foot to automatically back off the throttle under certain conditions and to apply more throttle under other conditions. The collapsible means is in the form of an air tight bag having communication with the fuel intake manifold by a suitable conduit, this bag supporting a foot engaging member in an outer position and being responsive by the vacuum conditions in the fuel intake manifold for backing off or applying the throttle.

BRIEF DESCRIPTION OF THE DRAWINGS

FIG. 1 is a side elevation view of the present throttle trimming device as applied to an accelerator pedal.

FIG. 2 is an enlarged top plan view, partly broken away, of the throttle trimming device, taken on the line 2—2 of FIG. 1;

FIG. 3 is an enlarged vertical sectional view taken on the line 3—3 of FIG. 1;

FIG. 4 is an enlarged fragmentary sectional view taken on the line 4—4 of FIG. 2;

FIG. 5 is an end view taken on the line 5—5 of FIG. 1; and

FIG. 6 is an exploded or assembly view of the device.

DETAILED DESCRIPTION OF A PREFERRED EMBODIMENT

With reference first to FIG. 1, the numeral 10 designates a conventional accelerator pedal movably attached to a vehicle 12 as by a hinge 14. Throttle linkage means 16 extend between the pedal 10 and fuel inlet control means, not shown.

The present throttle trimming device includes a casing or housing 18 formed with side walls 18a and end walls 18b, the top and bottom of the casing as formed being open. A removable top wall 22 seats on the casing 18, and this wall has end tabs 24 with openings 26 therein. A bottom wall 28 slidably fits in the open bottom of the casing for vertical adjustment therein and has end tabs 30 at each end that extend slidably out through slots 32 in each end wall 18b of the casing. Tabs 30 have threaded bores 34, and clamp bolts 36 extend down through tabs 24 of the top wall 22 and threadedly engage bores 34 for applying a selected clamping pressure, to be described in greater detail hereinafter.

Bottom wall 28 has a layered construction forming a horizontal space 28a therein, and this space receives the body section of a length adjusting clamp 38 arranged to encircle the accelerator pedal 10 and hold the casing 18 in a selected position when tightened.

Top wall 22 has a plurality of laterally extending paralled openings 40, and extending through these openings are projections or ribs 42 integral with body member 44 confined slidably within the housing 18. The projections 42 are engagable by the operator's foot in the operation of the device, and these projections and their supporting body member are preferably formed of a friction material such as rubber. The casing 18 is of sufficient length to provide proper foot support for the operator.

Disposed under the rubber member 44 is a rigid plate 46, such as a metal plate, and disposed under this plate is a flexible air bag or envelope 48 filled with a resilient supporting material 50 such as sponge rubber. Air bag 48 is confined between the bottom wall 28 of casing 18 and the plate 46, and the sponge rubber 50 therein is of sufficient compressive strength to hold the foot engaging member 44 in its uppermost position in throttling movements of the accelerator pedal except under certain vacuum conditions in the air bag 48 as will now be described.

As seen in FIGS. 1 and 2, the air bag 48 has an end fitting 52 for receiving a conduit 54, such as a flexible hose, connected at its other end into the fuel intake manifold, not shown. Fitting 52 has a needle control valve 56 therein and extends through a vertically elongated opening 58 in an end 18b of the casing.

In the operation of the present throttle trimming device, it is applied to the accelerator pedal 10 as shown in FIG. 1 whereby operation of the accelerator pedal is by engagement of the operator's foot thereon. In applying the clamp 38 to the pedal, it is first positioned in the space 28a of the bottom wall 28 as necessary to fit the accelerator pedal of the particular vehicle, and when the clamp is tightened, it secures itself to the casing 18 and it also secures the casing to the pedal.

The conduit 54 is connected into the fuel intake manifold such as into an engine vacuum hose. As explained hereinbefore, the resilient support means 50 in the air bag 48 has a selected compressive strength such that under lesser vacuum conditions of the manifold, such as during fast starts of the vehicle or during fast acceleration, it will not be collapsed. However under higher vacuum conditions such as during driving conditions wherein the butterfly valve of the carburetor is nearly closed, namely in a cruising condition, regardless of the speed, the present device becomes responsive. For example, while cruising on the freeway and the throttle is at medium depression, a higher vacuum condition thus existing in the intake manifold, any appreciable downgrade in the freeway will reduce the load on the engine and the engine will speed up. This speed-up of the engine without throttle change increases the vacuum in the intake manifold and this causes the bag 48 to draw in. The collapsing of the bag allows the accelerator pedal to raise under the operator's foot and automatically back off the throttle. In the reverse situation wherein the vehicle encounters an upgrade, the engine will slow down and this reduces the vacuum in the intake manifold. This allows the air bag 48 to expand which will automatically apply additional throttle. The same operation as described will result at any cruising speed of the vehicle wherein higher vacuum conditions exist and assuming of course that vacuum conditions raise and lower because of engine load conditions. This automatic throttle adjustment reduces operator control and in addition to smoothening out operation of the vehicle it reduces throttle operation by the driver to lessen possibility of over-throttling. The reduction in over-throttling increases gas mileage and reduces exhaust emissions.

Clamp bolts 36 may be tightened or loosened as necessary for adjusting the bottom wall 28 in selected compression against the air bag 48. This adjustment may be desirable to adapt to throttling conditions of different size engines or different throttle linkages and throttle return spring tensions.

The needle valve 56 is adjustable to adapt the system to various vacuum systems of different cars and furthermore prevents any surging of vacuum from reaching the air bag 32.

It is to be understood that the form of my invention herein shown and described is to be taken as a preferred example of the same and that various changes in the shape, size and arrangement of parts may be resorted to without departing from the spirit of my invention or the scope of the subjoined claims. For example, casing 18 itself may comprise the accelerator pedal rather than being attachable to existing accelerator pedals as shown herein.

Having thus described my invention, I claim:

1. A throttle trimming device operative with an internal combustion engine of the type having a vacuum operating fuel intake system and throttle means for controlling the flow to the fuel intake system, comprising
    (a) a flexible air tight bag arranged to be supported on throttle means of an internal combustion engine and arranged to be connected in communication with a vacuum operating fuel intake system of an internal combustion engine,
    (b) foot engaging means supported on said air bag,
    (c) said air bag being arranged to be collapsible and expandable by vacuum conditions in the fuel intake system for moving said foot engaging means under the operator's foot and automatically backing off or applying the throttle,
    (d) and a resilient filler in said air bag arranged in selected vacuum conditions to hold said foot engaging member in extended position.

2. A throttle trimming device operative with an internal combustion engine of the type having a vacuum operating fuel intake system and throttle means for controlling the flow to the fuel intake system, comprising
    (a) a casing arranged to be supported on throttle means of an internal combustion engine,
    (b) flexible vacuum operated means enclosed in said casing arranged to be connected in communication with a vacuum operating fuel intake system of an internal combustion engine,
    (c) and foot engaging means on said vacuum operated means,
    (d) said flexible vacuum operated means being arranged to be collapsible and expandable by vacuum conditions in the fuel intake system for moving said foot engaging means under the operator's foot and automatically backing off or applying the throttle.

3. The throttle trimming device of claim 2 wherein said casing has an adjustable compressive means for said flexible vacuum operated means arranged in its adjustment to vary the extendable and retractable movement of said foot engaging means.

* * * * *